Patented Nov. 10, 1931

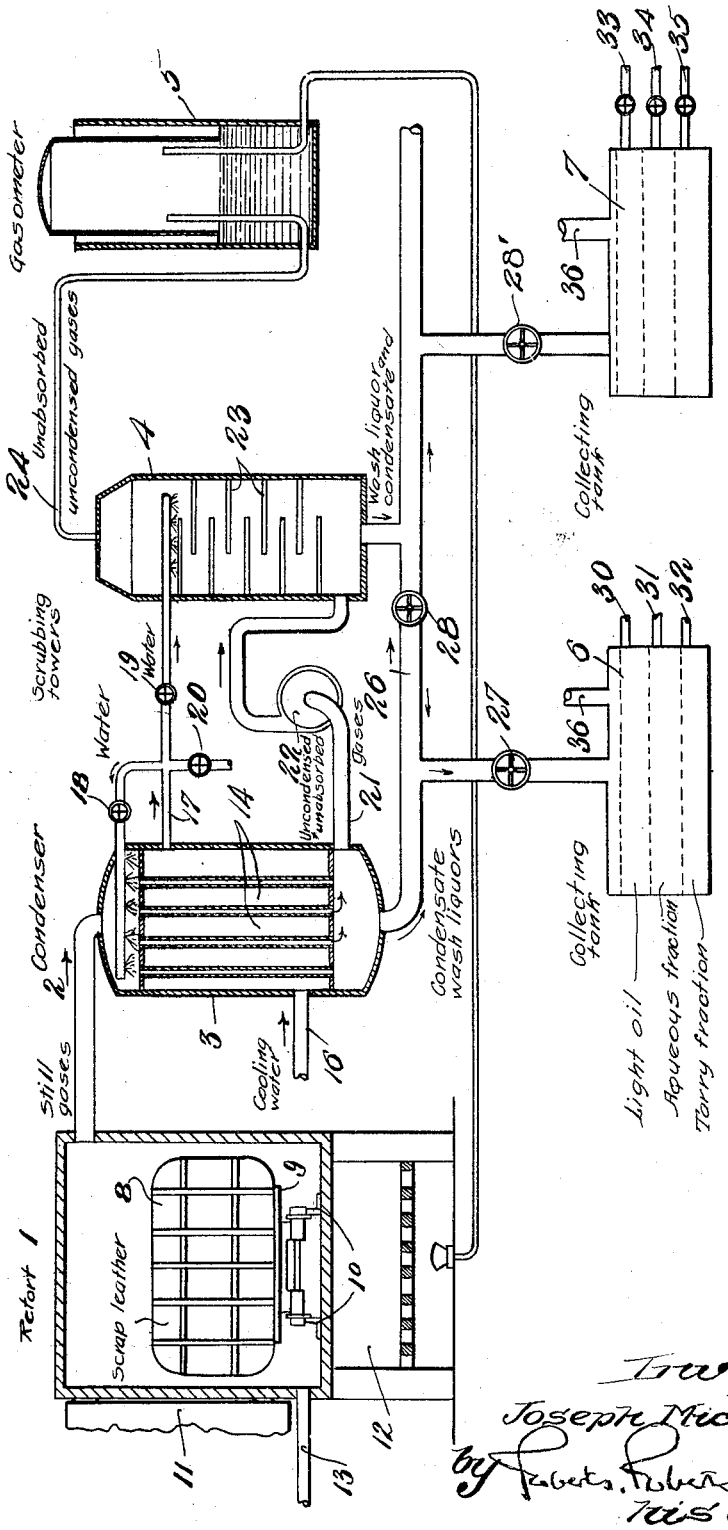

1,830,921

UNITED STATES PATENT OFFICE

JOSEPH MICHELMAN, OF BOSTON, MASSACHUSETTS

METHOD OF MAKING DECOMPOSITION PRODUCTS FROM LEATHER, AND CERTAIN PRODUCTS THEREOF

Application filed April 3, 1924. Serial No. 703,990.

This invention relates to a process of treating tanned leather wastes for the recovery of certain valuable products of decomposition thereof, and to certain products resulting from practice of the process.

This process is applicable to leather which has been tanned by any of the well-known tanning processes commercially employed, whether characterized by vegetable, mineral or oil tannage, and is preferably carried out upon scrap or waste leathers, or secondary leather products, leather board, used leather articles, such as discarded footwear, machine belts and the like, otherwise of little or no value. Waste leathers so produced may be mixed, but the leather making and working industries constantly produce large quantities of clean, classifiable scraps, offal so called, and wastes easily segregated in accordance with the tannage to which the material has been subjected, and such classified wastes are peculiarly valuable raw material for this process, which recovers values in decomposition products some of which vary in accordance with the tannage. While segregation of the material enables like treatments to produce different products from different materials, the process of this invention nevertheless enables the recovery and separation of valuble substances from mixed raw materials of the class indicated.

According to this process, the material is subjected to destructive distillation, with subsequent recovery of values in the decomposition products both of the distilled residue and of the distillate.

A typical instance of the process will be explained as carried out with the aid of apparatus illustrated in elevation by the accompanying drawing, in which 1 represents a horizontally mounted retort, having a vapor outlet 2 leading to primary condenser 3, and in turn connected with a scrubbing tower 4 and gasometer 5, and with collecting tanks 6, 7 for the distillate and wash-water.

The retort 1 is recommended to be of a type adapted to receive a charge of the material to be processed in segregable units, which may be in suitable open metal containers, or comprise packages such as the billets or bales 8, adapted to separate into units the contents of a container such as one of the trucks 9 running upon rails 10, and adapted to be run into the retort 1 through door 11. The retort 1 is provided with any suitable means for controlled heating, such as a furnace 12 situated beneath the retort. The apparatus is recommended to contain means, such as a pipe 13 inserted through the wall of the retort by which steam or hot gases not capable of supporting combustion may be brought into contact with the material during treatment.

The exhaust outlet 2 may lead from the top of the retort 1 into the primary condenser 3, which preferably is provided with cooling means such as the vapor-tube drum 14 having a water inlet at 16 and an outlet at 17.

The cooling water may be directed into the vapor spaces of condenser 3 in the form of a spray by means of valve 18, or into the scrubbing tower 4 by means of valve 19, or into a waste pipe through valve 20.

It is recommended that the vapors from retort 1 be positively withdrawn, and that the retort be kept under negative or neutral pressure in respect to the atmosphere. Near the bottom of condenser 3 a vapor outlet 21 may be provided leading through any suitable fan or pump 22 for the removal of the evolved vapors into the bottom of scrubbing tower 4, which may be provided with baffles 23, and a waste vapor outlet 24 at the top connecting with the gasometer 5, depended upon to hold the scrubbed gases and vapors of substances not liquid at the condensing-water temperature. These comprise principally hydrogen, carbon monoxide and carbon dioxide, with some gases of complex constitution. For avoidance of odor nuisance, these gases may be burned in furnace 12.

Liquid condensates from condenser 3 and the wash-water from scrubber 4 flow into a main 26 having a valve 28, a branch having a valve 27 leading to a collecting tank 6, and a branch having a valve 28' leading to a similar tank 7.

Tanks 6 and 7 may be provided with air vents 36 and with valved outlets 30, 31, 32 and 33, 34, 35, respectively, placed at different levels to separately decant gravity-stratified layers of the fluid condensates and aqueous solutions from the condenser and scrubber.

The leather scrap, for example that obtained from vegetable tanned stock, may be treated in the retort 1 in its unchanged condition, or may first be subjected to hydrolysis by digestion with steam or by boiling in water, an acid or alkaline solution, and then dried or partially dried. If hydrolyzed, the hydrolytic agent may be expected to yield gelatinous materials and oils, as familiar in treatments of leather-scrap for making crude sizes and fertilizers. Such hydrolysis is of no particular effect on the subsequent treatment. The dried material may then be formed into one of the above-mentioned types of billets or packages, if desired, with admixture of an inert substance, such as calcium carbonate, to prevent caking; and a charge entered into the retort 1, conveniently on a truck 9; but the retort may be charged in bulk, if desired, without detriment to recoveries from the distillate.

The door 11 being closed, and the temperature raised by suitable control of the heating means employed, evolution of vapors begins at about 100° C. As the temperature rises, and especially in case of a charge of tannin-tanned leather, an inert gas such as steam or flue-gases may be introduced into the retort to prevent combustion of the charge and to promote removal of vapors therefrom. The temperature is raised gradually to a point between 400° and 800° C.; typically for instance, to 600° C., and maintained for a sufficient time, for example from 6 to 12 hours, depending upon the amount and condition of the charge. During this treatment a profound destructive alteration of the leather to the carbon, the mineral and refractory contents only, of the charge takes place, and a large volume of vaporous decomposition products distills over. The charge noticeably swells in volume, and for this reason the billets or packages of which it is comprised should be well bound, or, if in bulk, in sufficient volume only to permit the swollen residue to be removed without mechanical difficulty.

The evolved vapors contain certain hydrocarbon oils from dressings, paraffin, pyrrole, pyrocatechol, pyrogallol, hydroxyl and carboxylic derivatives of benzene; carbon monoxide and carbon dioxide, ammonia and other nitrogen and sulphur compounds and water vapor.

The decomposition products thus obtained, mixed with the inert carrier gas are cooled in condenser 3 and the heavier, less volatile constituents are condensed. The lighter and more volatile constituents may be washed or dissolved out by the spray of wash-water introduced into the top of the condenser. The condensates and aqueous solution thus produced collect at the bottom of the condensing chamber and are drawn off through main 26 and valve 27 to tank 6, or through valve 28 to tank 7.

The residual gases from the condenser are withdrawn through outlet 21 and forced into the scrubbing tower 4 by pump 22, where the gases meet a second spray of wash-water controlled by operation of valve 19. The temperature of the efflux is here further reduced and the soluble and less volatile constituents are scrubbed out, the gaseous residue passing off through outlet 24 to the gasometer 5.

The condensate in tanks 6 and 7 may be composed of two or three distinct gravity-separated layers, depending upon the kind of material used. In the case of tannin-tanned leather scrap, it is preferable to remove the ammoniacal liquor or layer from the other oil and tar layers. The ammoniacal liquor is then treated with sufficient calcium chloride or other suitable reagent to precipitate the carbonate present. Ammonium chloride may be simultaneously formed. The supernatant liquid is evaporated, whereupon ammonium chloride and pyrocatechol, and other phenols and hydroxyl and carboxylic derivatives of benzene separate out. The organic compounds are then separated from the ammonium chloride with the usual solvents, such as ether or alcohol. Alternatively, the ammoniacal liquor may be directly neutralized with acids, and the ammonium salts and organic compounds recovered in the same manner. Recoveries of about 160 pounds of ammonium sulphate, for example, to the ton of scrap are usual.

The tarry and oily separates in tanks 6 and 7—the remainder of the condensate from tannin-tanned leather scrap—may be washed with water from which the phenols are recovered. The residue contains pyrrole, pyrocoll, and other pyrrole derivatives, and hydrocarbon oils in the case of the oily separates.

The condensate from the other kinds of leather scrap may be treated in the same manner. No provision is here necessary for the recovery of pyrocatechol and other hydroxyl and carboxylic derivatives of benzene, or other substances which are peculiarly the result of decomposition of tannin-tanned leather. The tar and oil layers of the condensate may contain paraffins and hydrocarbon oils used in treating the various leathers. These are appropriately recovered.

When a charge in the retort has been subjected to sufficiently thorough distillation, the retort residue is cooled out of contact with the air. This may be done by employing retorts alternately, the vapor outlet 2 being capable of alternative connection to two or more retorts (not shown). In a large plant, the retort proper may connect with a cooling chamber for the charge, capable of being filled with inert gases, and the charge may be removed and shut off from the retort 1 in the inert atmosphere without exposure to oxygen, according to well-known practice in the destructive distillation of wood for charcoal.

The char from tannin-tanned materials remaining in the retort 1 is a charcoal partaking of the characteristics of both animal and vegetable charcoals, and this residual substance is of high form-value because of its open and porous texture, resulting from the interstitial swelling of the carbonized fibrous constituents and driving off the volatilizable interstitial substances. If destined for use for clarification or deodorization, it is recommended to treat this residue by boiling in a dilute alkaline solution, washing in water, neutralization with a dilute acid solution, washing and drying. The active surfaces of this leather charcoal are of very large area comparatively to either the volume or the weight of the material.

In the case of any of the materials, the retort residue, preferably powdered, is a useful material as a black pigment, a filler, a filter-aid, and for other purposes for which bone-black or charcoal have been employed.

The charcoal produced by this process from chrome-tanned leather is not serviceable in all of these uses because of its large content of chromium but is of high utility where adsorption and catalysis are to be simultaneously effected, as in the treatment of reacting gaseous mixtures. Economic utilization of the residue from this kind of leather may include recovery of the chromium in the form of chrome green (chromic oxide, $Cr_2O_3$). The char from chrome-tanned material permits recovery of about 14% by weight of the char as chrome green very simply by burning the residue in a current of air, with evolution of carbon monoxide, and carbon dioxide, the chromic oxide being left as an ash in a comparatively pure state.

When the material available for treatment comprises segregable chrome and tannin-tanned leathers, capable of separate baling or billeting, it is not necessary that the entire charge in a retort shall comprise only one of these materials; the charge may comprise separate portions of each. The distillate is then treated in common, with no disadvantages, but the retort charcoal is in separable lots, and separately treated as herein recommended.

I claim:

1. The method of making decomposition products from leather comprising subjecting leather scrap to destructive distillation in an inert atmosphere, condensing the distillate, subjecting the efflux to aqueous absorption, separating the respective products by gravity, decanting the respective portions, and treating one of the unabsorbed liquids for the recovery of organic substances.

2. The method of making decomposition products from leather comprising subjecting leather scrap to destructive distillation at temperatures gradually rising from 100° C. to above 400° C. out of contact with air, condensing the volatile distillate produced, and segregating constituents of said distillate by gravity separation and decantation.

3. The method of making decomposition products from leather comprising subjecting leather scrap to destructive distillation at temperatures gradually rising from 100° C. to above 400° C., condensing the distillate, subjecting the efflux to aqueous absorption, and treating the collected liquids for the recovery of organic substances.

4. The method of making decomposition products from leather comprising subjecting leather scrap to destructive distillation, condensing the distillate, settling and decanting off the oily and tarry constituents of the distillate, and treating said constituents to separate out pyrrole, pyrocoll and other pyrrole derivatives.

5. The method of making decomposition products from leather comprising subjecting leather scrap to destructive distillation, condensing the distillate, subjecting the efflux to aqueous absorption, settling and separately decanting off the oily and tarry constituents and the aqueous constituents of the liquids collected, and treating one of said constituents to separate out organic compounds such as phenols, hydroxyl and carboxylic derivatives of benzene.

6. The method of making decomposition products from leather comprising subjecting leather scrap to destructive distillation in a closed vessel at temperatures gradually rising from 100° C. to above 400° C., condensing and subjecting to aqueous absorption the volatile distillate produced, and segregating the constituents of said distillate by gravity separation and decantation.

7. A decomposition product of tanned leather comprising an ammoniacal liquor and a tarry fraction heavier than water containing phenols and other organic compounds.

Signed by me at Boston, Massachusetts, this 31st day of March 1924.

JOSEPH MICHELMAN.